(12) United States Patent
Inoue et al.

(10) Patent No.: US 7,549,335 B2
(45) Date of Patent: Jun. 23, 2009

(54) FREE FALL DETECTION DEVICE

(75) Inventors: Hideki Inoue, Hitachi (JP); Munetoshi Unuma, Hitachinaka (JP); Yasunori Abe, Moka (JP); Masakatsu Saitoh, Yokohama (JP)

(73) Assignee: Hitachi Metals, Ltd., Tokyo (JP)

( * ) Notice: Subject to any disclaimer, the term of this patent is extended or adjusted under 35 U.S.C. 154(b) by 120 days.

(21) Appl. No.: 11/356,238

(22) Filed: Feb. 17, 2006

(65) Prior Publication Data

US 2006/0236761 A1 Oct. 26, 2006

(30) Foreign Application Priority Data

Apr. 22, 2005 (JP) .............................. 2005-124410

(51) Int. Cl.
*G01P 15/08* (2006.01)
*G11B 21/02* (2006.01)

(52) U.S. Cl. .......................................... 73/510; 360/75

(58) Field of Classification Search .................. 73/510, 73/514.01; 340/669; 702/141; 360/75
See application file for complete search history.

(56) References Cited

U.S. PATENT DOCUMENTS

| | | | |
|---|---|---|---|
| 7,142,385 B2 * | 11/2006 | Shimotono et al. ............. | 360/60 |
| 7,191,089 B2 * | 3/2007 | Clifford et al. ............... | 702/141 |
| 7,328,615 B2 * | 2/2008 | Kwon et al. ................... | 73/488 |
| 2004/0252403 A1 | 12/2004 | Wehrenberg | |
| 2005/0270700 A1 | 12/2005 | Matsumoto | |

FOREIGN PATENT DOCUMENTS

| | | |
|---|---|---|
| EP | 0 658 894 A1 | 6/1995 |
| JP | 2000-241442 A | 9/2000 |
| JP | 2000-258453 A | 9/2000 |
| JP | 2006-107657 A | 4/2006 |

OTHER PUBLICATIONS

European Search Report dated Apr. 5, 2007 (Eleven (11) pages).
IBM Corporation: "Disk drive operating drip shock protection", Research Disclosure, Mason Publications, Hampshire, GB, vol. 449, No. 128, Sep. 2001, XP007128982 ISSN: 0374-4353.
European Search Report dated Aug. 23, 2006 (Four (4) pages).

* cited by examiner

*Primary Examiner*—John E Chapman
(74) *Attorney, Agent, or Firm*—Crowell & Moring LLP

(57) ABSTRACT

A free fall detection device capable of detecting a fall accompanied by rotation is provided. A fall accompanied by rotation is detected based on a waveform of an acceleration signal output from the acceleration detection unit and an angular velocity signal output from the angular velocity detection unit. A gravity center acceleration of the device to be protected is calculated from the acceleration detected by the acceleration detection unit and from the angular velocity detected by the angular velocity detection unit. Even when the device being protected rotates as it falls, the fall of the device can be detected from the detected acceleration or angular velocity. Further, by calculating the gravity center acceleration not affected by the rotation, it is possible to detect a fall of the device with high precision even if the device rotates as it falls.

4 Claims, 14 Drawing Sheets

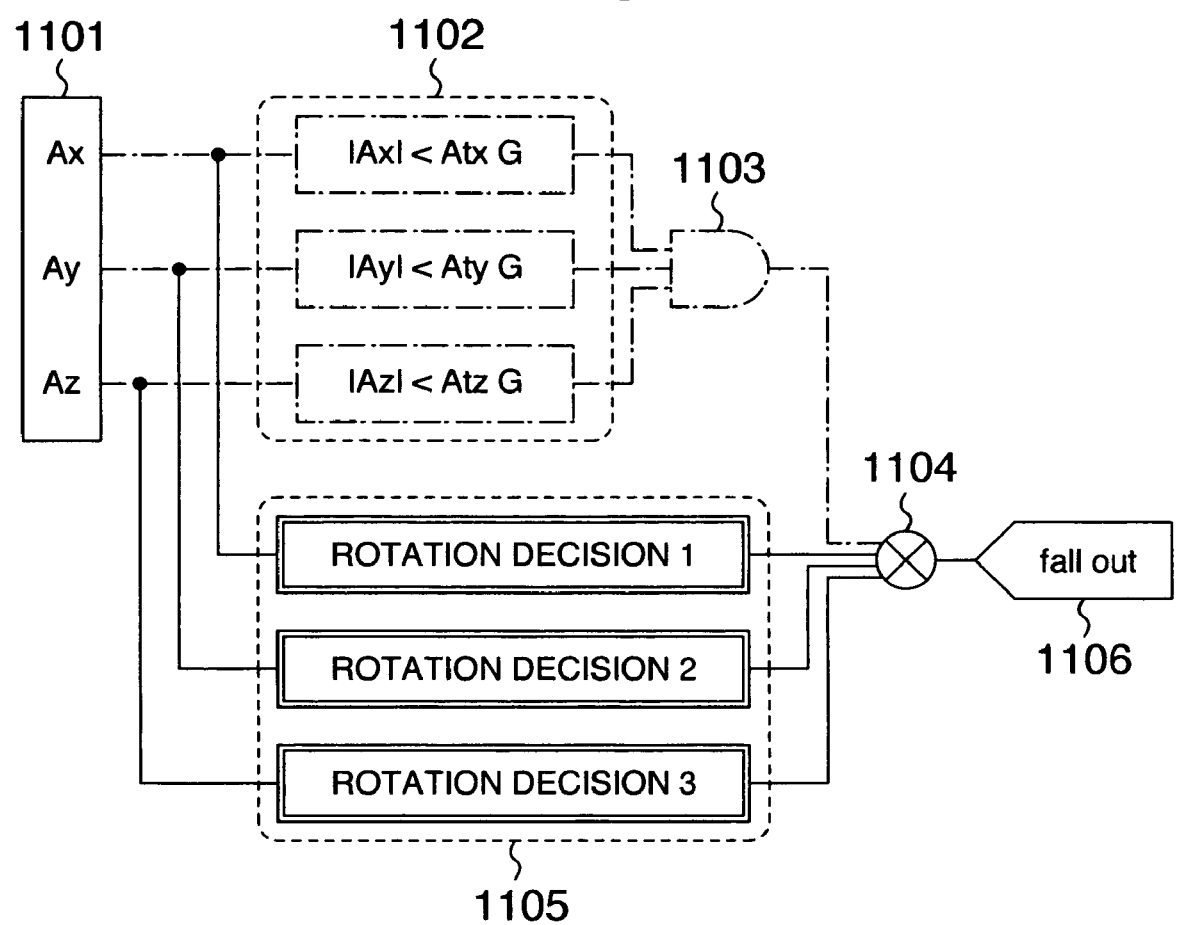

| ROTATION SPEED DURING FALL → | LOW SPEED | ⟷ | HIGH SPEED |
|---|---|---|---|
| ROTATION IS DETECTED BECAUSE ACCELERATIONS ARE LESS THAN THRESHOLD IN ALL AXES | | | |
| ROTATION IS DETECTED BY ROTATION DECISION PROCESSING | | | |

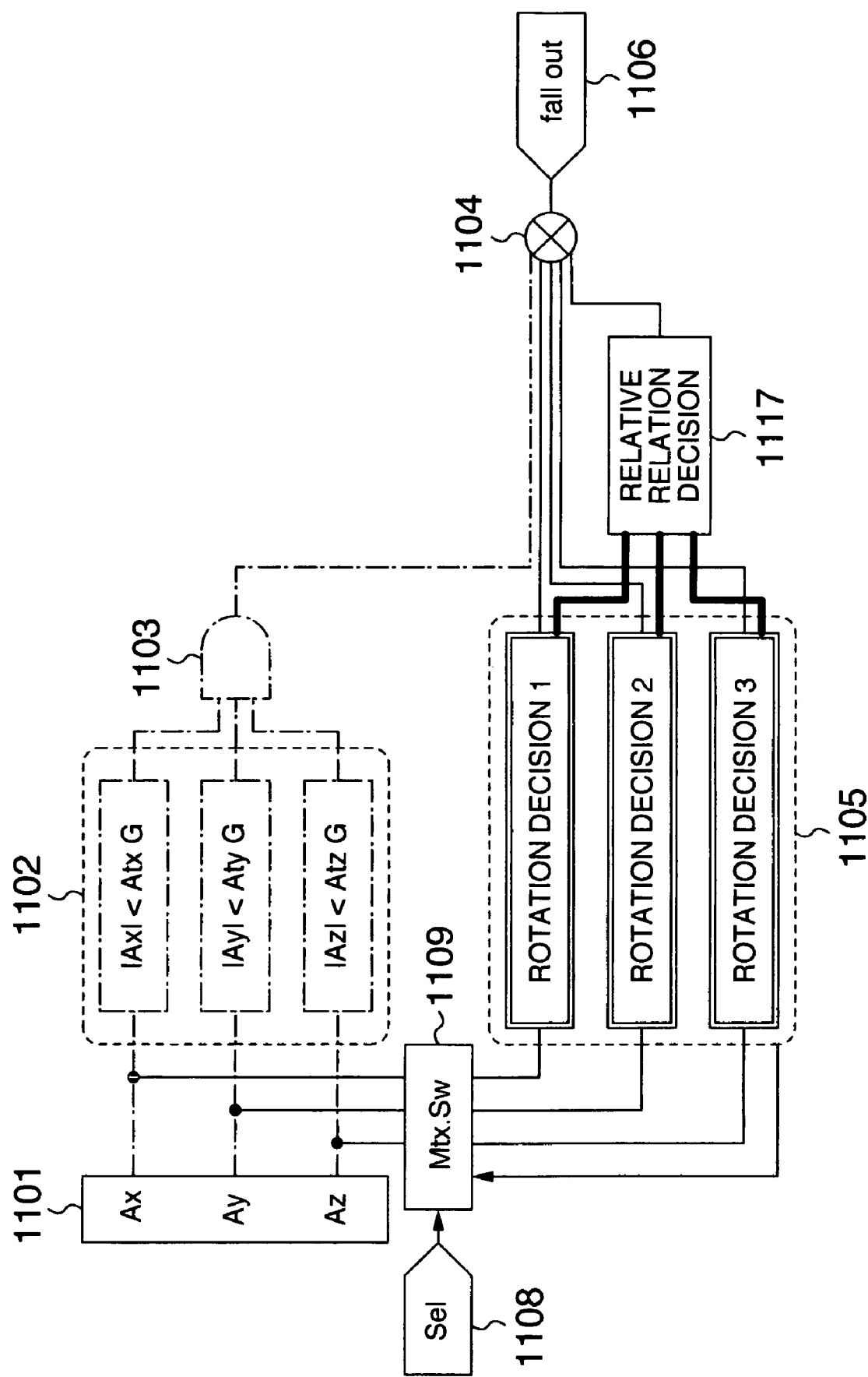

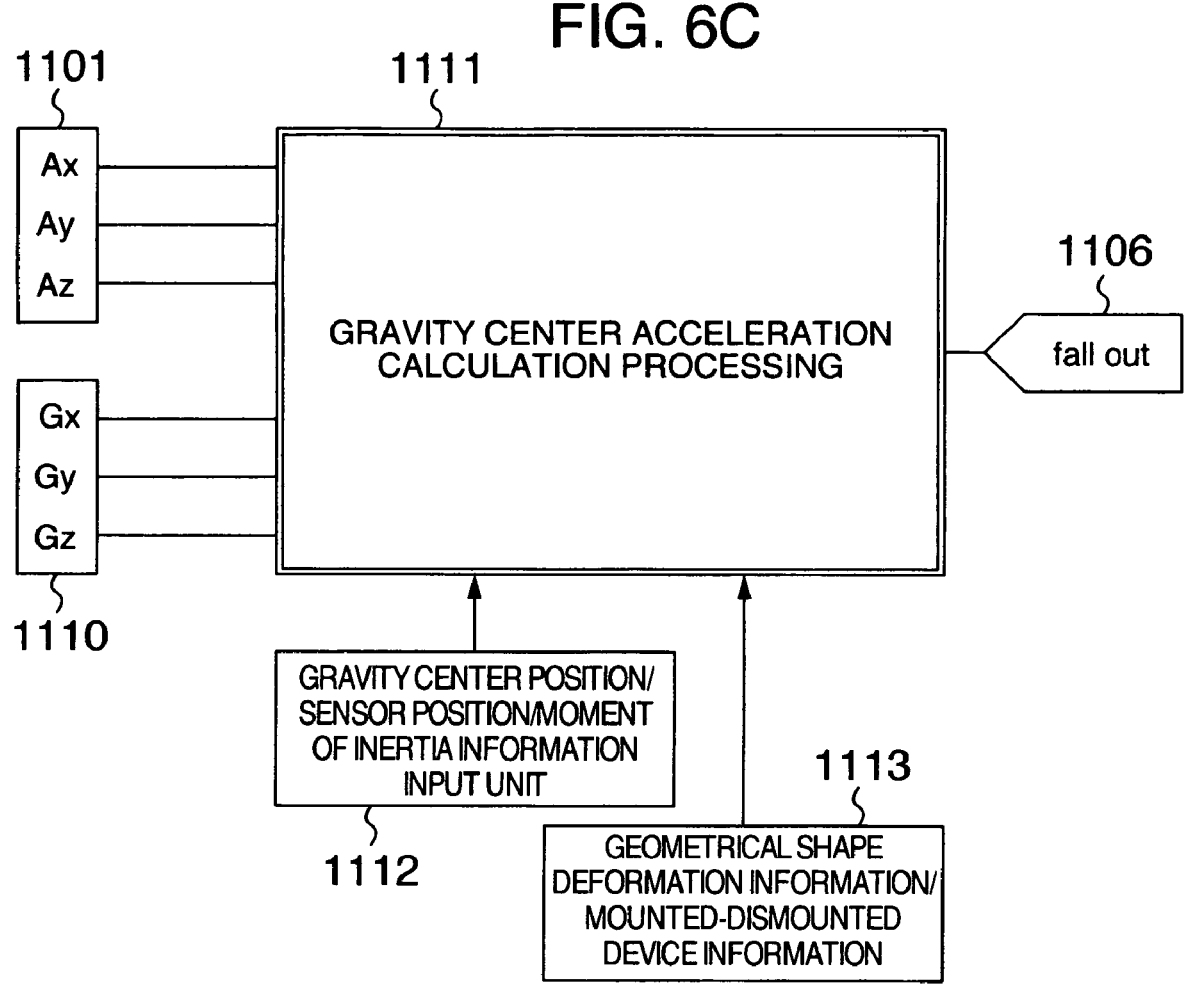

GRAVITY CENTER→SENSOR
POSITION VECTOR

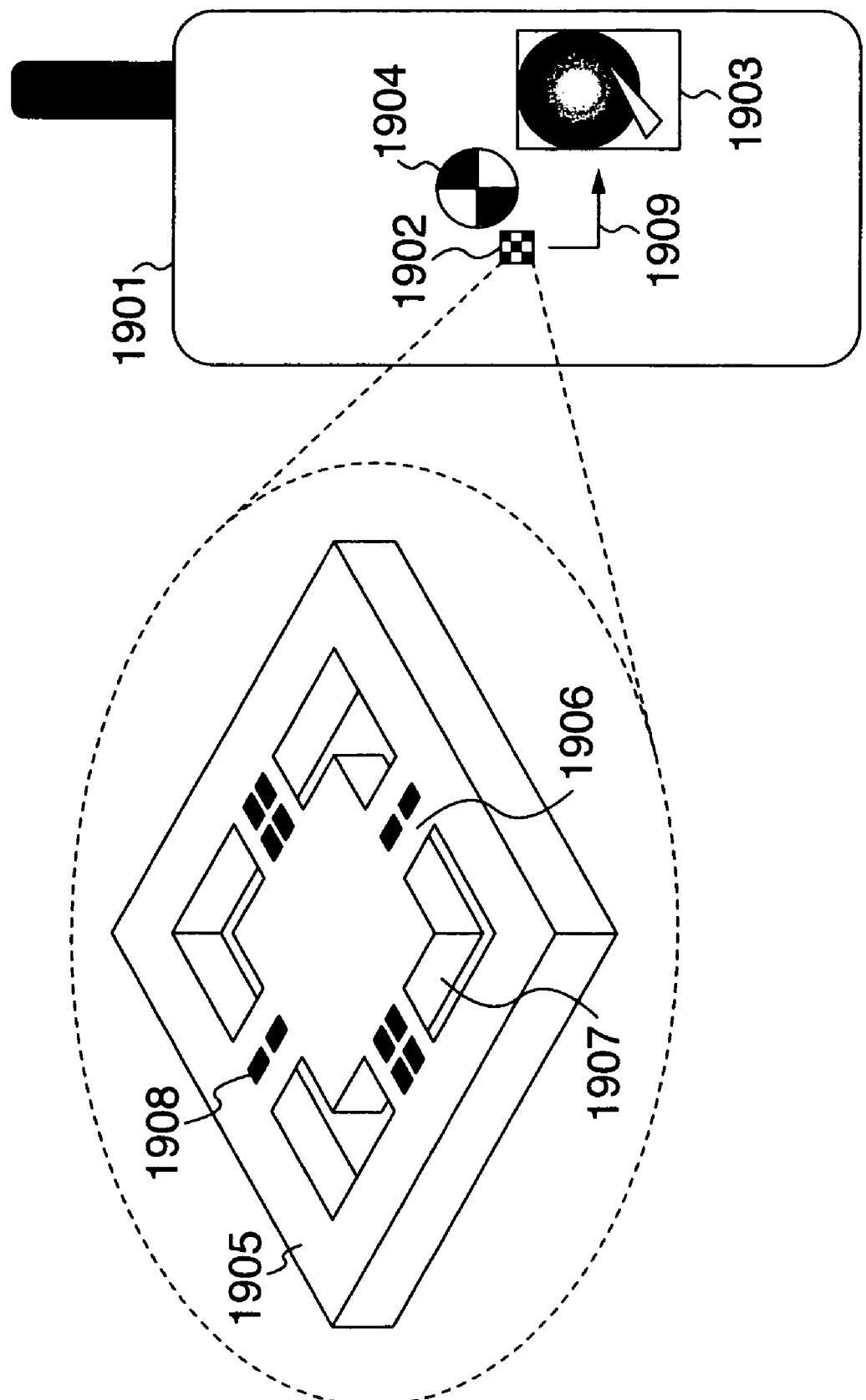

FIG. 11A

1501 — KIND OF SENSOR USED
- ACCELERATION
- ANGULAR VELOCITY
- ACCELERATION/ ANGULAR VELOCITY
- ---

1502 — SENSOR TYPE NUMBER
- ACCELERATION : xxxx
- ANGULAR VELOCITY : yyyy
- ---

1503 — NUMBER OF DETECTION AXES USED
- ACCELERATION: 3 AXES
- ANGULAR VELOCITY: 3 AXES
- ---

1504 — DESIRED DETECTION SENSITIVITY
- HIGH
- LOW
- ---

1505 — PERFORMANCE PRIORITY ORDER
- MAXIMUM ROTATION SPEED DURING FALL
- FALL DETECTION DISTANCE
- LOW UNDESIRED OPERATION RATE
- LOW OPERATION FAILURE RATE
- LOW COST

1506 — HDD PARKING TIME: ○○ms

1507 — DISTANCE FALLEN: △△cm

1508 — HDD ACCESS DUTY: □%

FIG. 11B notice

DETECTION SENSITIVITY MAY BECOME INSUFFICIENT. FOLLOWING OPTIONS ARE AVAILABLE FOR SOLUTION.

* INCREASE THE NUMBER OF SENSOR AXES USED
* INCREASE THE NUMBER OF SENSOR INSTALLATION LOCATIONS
* INCREASE THE NUMBER OF SENSOR KINDS USED
* ALLEVIATE SENSOR INSTALLATION RESTRICTIVE CONDITIONS

1601 inquiry

DETECTABLE FALL DISTANCE IS 120 cm OR MORE.

[ Yes ]   [ No ]

1602 trade off

IF DETECTABLE FALL DISTANCE IS LESS THAN 30 cm, UNDESIRED OPERATION RATE/OPERATION FAILURE RATE WILL EXCEED TARGET VALUE. FOLLOWING CONDITIONS NEED TO BE TRADED OFF.

| ✓ | CHANGE SENSOR KIND |
| ☐ | CHANGE NUMBER OF SENSORS |
| ✓ | CHANGE TO HIGH-SPEED PARKING HDD |
| ☐ | CHANGE DETECTION ALGORITHM |
|   | --- |

1603 sim. results rot tolerance
z=004mm
x-y plane

Thresh.:xx
cal. preriod:yy
rot vect_div.:**
axis:1-3

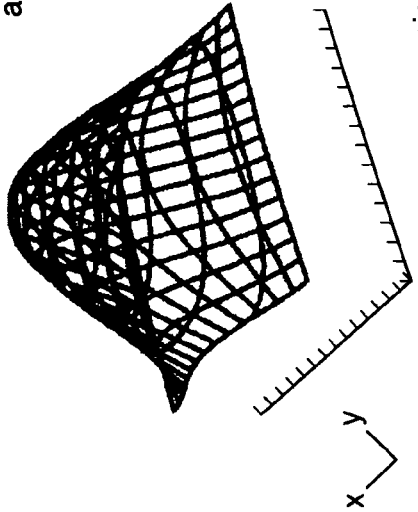

project.xxx

1604

FREE FALL DETECTION DEVICE

BACKGROUND OF THE INVENTION

This invention relates to a free fall detection device capable of detecting a fall accompanied by rotation.

Devices that can improve an impact resistance by knowing when an object finishes falling include a magnetic disk. A magnetic disk has a greater impact resistance in a landing zone where a head is parked when it does not perform reading or writing than in an area where the head can perform reading or writing. Thus, by detecting a fall of the disk and move the head to the landing zone before landing, the impact resistance of the magnetic disk against the fall head can be enhanced.

An example conventional technique to realize the above function using an accelerometer involves deciding a free fall when outputs of accelerometers in three axial directions not on the same plane (e.g., orthogonal x, y and z axes) are almost zero simultaneously (see JP-A-2000-241442 for example).

In the above conventional technique, when a device to be protected rotates as it falls, the accelerometers detect a centrifugal force. So, the outputs of the accelerometers on all axes do not become almost zero at the same time, failing to detect the fall.

A problem that this invention aims to solve is to provide a free fall detection device capable of detecting a fall accompanied by rotation.

SUMMARY OF THE INVENTION

The free fall detection device of this invention has a rotation decision unit that detects a fall accompanied by rotation, based on an acceleration waveform detected by an acceleration detection unit or an angular velocity detected by an angular velocity detection unit.

The free fall detection device of this invention also has a gravity center acceleration calculation unit that calculates an acceleration of a gravity center of a device to be protected, from the acceleration detected by the acceleration detection unit and the angular velocity detected by the angular velocity detection unit.

With this invention, even when the device to be protected rotates as it falls, the fall of the device can be detected by the acceleration or angular velocity detected.

Further, with this invention, by calculating a gravity center acceleration not affected by the rotation, it is possible to detect the fall of the device with high accuracy even if the device being protected is rotating.

Other objects, features and advantages of the invention will become apparent from the following description of the embodiments of the invention taken in conjunction with the accompanying drawings.

BRIEF DESCRIPTION OF THE DRAWINGS

FIG. 1 is a functional block diagram of a free fall detection device as one embodiment of this invention.

FIGS. 5A, 5B, 5C are functional block diagrams of a free fall detection device as another embodiment of this invention.

FIGS. 6A, 6B, 6C are functional block diagrams of a free fall detection device as still another embodiment of this invention.

FIG. 9 illustrates an embodiment of a portable device mounted with the free fall detection device of this invention.

FIGS. 11A and 11B illustrate examples of an interface of the free fall detection device design support system.

DESCRIPTION OF THE EMBODIMENTS

FIG. 1 is a functional block diagram of a free fall detection device as one embodiment of this invention. First, let us explain about an operation of a fall detection unit that uses an acceleration threshold. Accelerations in three axial directions not in the same plane (orthogonal x, y, z axes), detected by a multiaxial accelerometer 1101, are subjected to a threshold decision processing by a fall decision unit 1102. Results of the threshold decision are logically ANDed by a logic operation unit 1103. If the accelerations of all axes are smaller than the threshold, i.e., nearly zero, it is decided that the device is falling and the result of decision is output from a fall detection output terminal 1106. Here, Atx, Aty and Atz are acceleration thresholds for the fall decisions in different axial directions and are set close to 0 G, such as 0.4 G.

Further, in this embodiment, outputs from the multiaxial accelerometer 1101 are subjected to a rotation decision processing by a rotation decision unit 1105. The rotation decision unit 1105 makes a decision on the rotation by checking acceleration waveforms of the device characterized by a centrifugal force produced by the rotation of the device as it falls. The result of the rotation decision processing is checked together with the threshold decision result by a logic operation unit 1104 which outputs its calculated result to the fall detection output terminal 1106. The threshold decision results, i.e., a fall decision result when the device is not rotating and a fall decision result when the device is rotating, may be output separately bypassing the logic operation unit 1104.

Figure 2A:
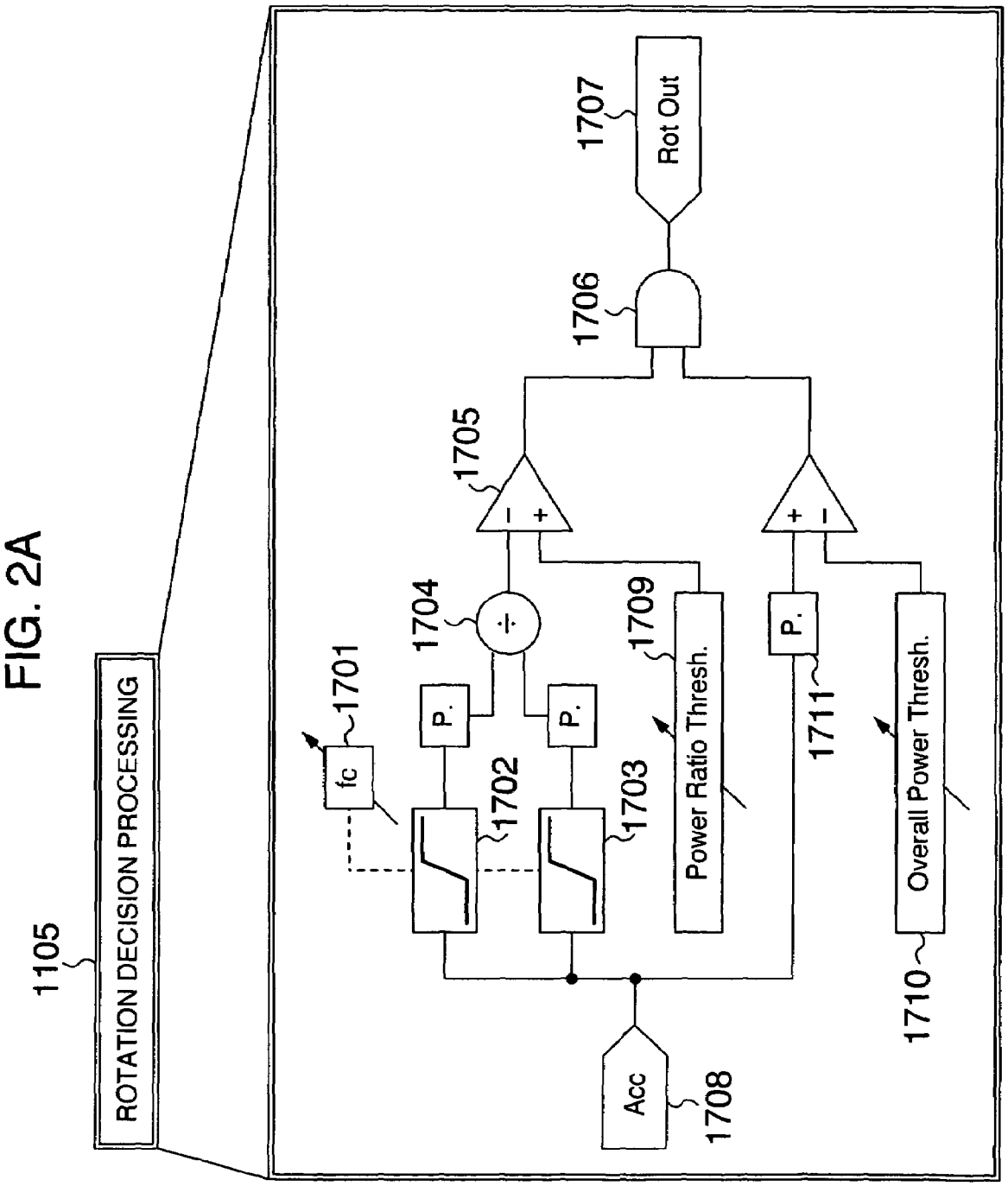
FIGS. 2A, 2B illustrate examples of rotation decision processing.
Figures 2B, 4:
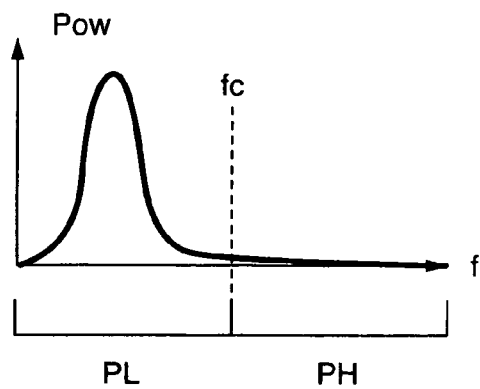
FIG. 4 illustrates a range of application of a fall decision method.

FIGS. 2A and 2B show examples of the rotation decision processing. FIG. 2A represents a rotation decision unit for one axis. This processing takes advantage of the finding obtained by the inventor of this invention that the acceleration waveform detected by the accelerometer mounted on the device being protected describes a relatively smooth sinusoidal-like waveform as the device rotates during its fall. When the waveform is close to sinusoidal, a spectrum of the acceleration waveform is characterized by a high frequency component PH being smaller than a low frequency component PL, as shown in FIG. 2B. Therefore, a ratio of power between the high frequency component and the low frequency component with a certain frequency fc as a boundary may be used as an index. More specifically, in FIG. 2A the acceleration value from an acceleration input unit 1708 is divided into a high frequency component and a low frequency component by a high-pass filter 1702 and a low-pass filter 1703 that extract the high frequency component and the low frequency component with the frequency fc as a boundary. These components are converted by a power calculation unit 1711 into power values. A calculation unit 1704 divides the power value of the high frequency component by the power value of the low frequency component. The calculated result is compared by a comparator 1705 with the threshold of power ratio held in a comparison decision value holder 1709. If the calculated result is smaller than the threshold, i.e., the waveform is close to a sine wave, the output of the comparator 1705 becomes logical 1. The boundary fc between the high frequency component and the low frequency component is set by a filter characteristic adjust unit 1701. The acceleration value from the acceleration input unit 1708 is converted by the power calculation unit 1711 into a total power value, without passing the acceleration value through the filters. A comparator compares this total power value with a total power threshold held in a comparison decision value holder 1710. If the total power value is greater than the total power threshold, the output of the comparator becomes logical 1. The output values of these two comparators are logically ANDed by a logical operation unit 1706. If the two output values are both logical 1, a logical product of 1, namely a decision that the fall is accompanied by rotation, is output from a rotation decision output unit 1707. The reason that the total power value of the acceleration waveforms is calculated is that, when both a denominator and a numerator are small, the division by the calculation unit 1704 may accidentally produce a calculated result (quotient) that is about the same as the rotation state. Although this embodiment applies a mask at a lower limit of the total power value, it is also possible to use a window comparator that uses an upper limit and thereby to reduce erroneous operations caused by impulse accelerations and improve a decision accuracy.

Figure 3:
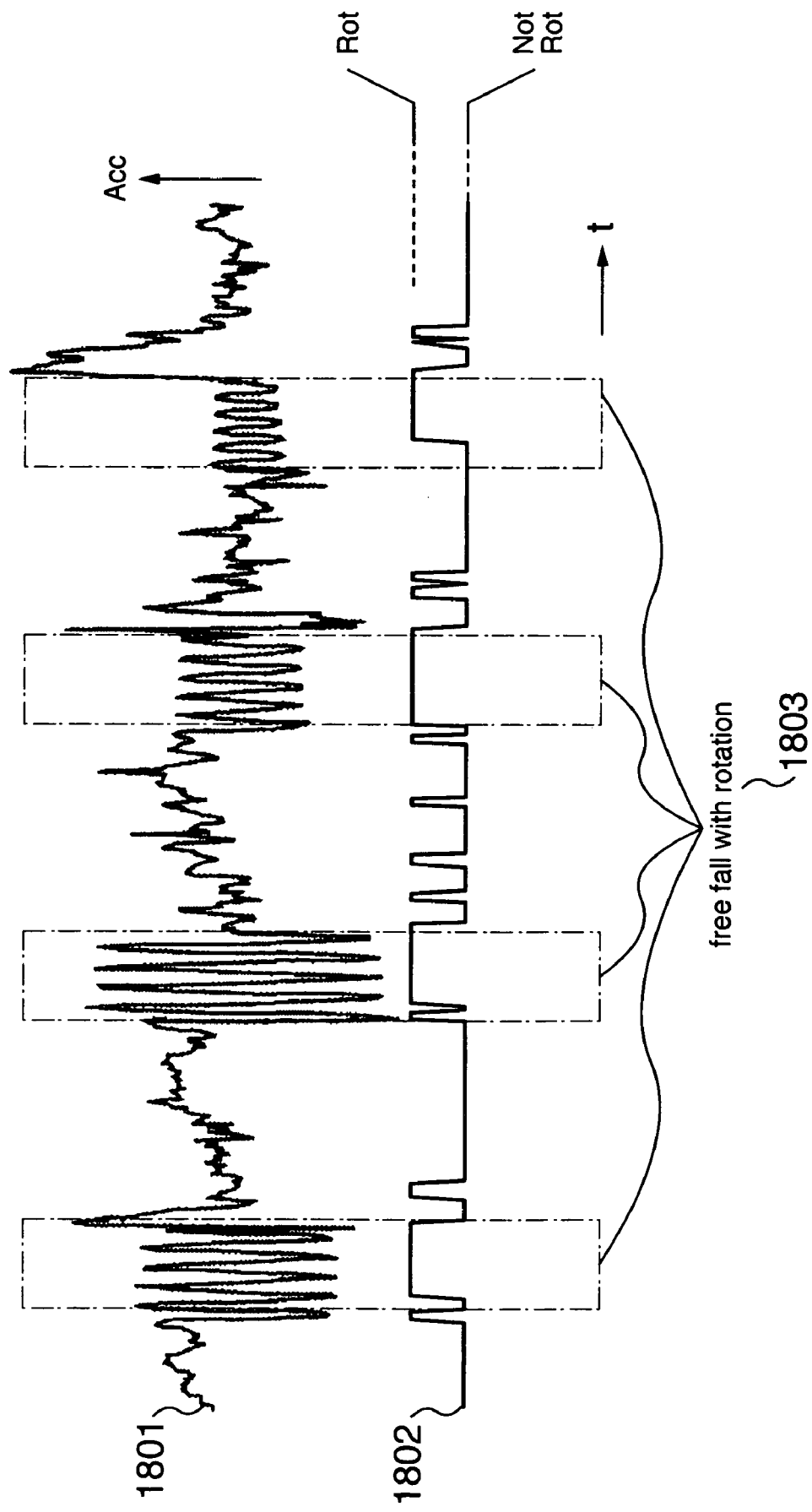
FIG. 3 illustrates an example of a rotation decision result.

FIG. 3 shows an example of rotation decision result. A waveform 1801 is an acceleration value and a waveform 1802 is a result of decision made on the rotation during a fall, i.e., an output of the rotation decision output unit 1707 in FIG. 2A. A crest (Rot) of the waveform 1802 represents a detection of the rotation during a free fall, a bottom (Not Rot) represents a non-detection of rotation. Free falls with rotation 1803, during which the acceleration waveform is nearly sinusoidal, almost match those portions of waveform 1802 which detect the rotation. Not only when the acceleration waveform is almost sinusoidal, can the rotation decision processing shown in FIG. 2A be also applied when the acceleration waveform is relatively smooth and repeats itself with small high frequency components.

The rotation decision processing 1-3 in three axial directions of FIG. 1 are not limited to the one shown in FIG. 2A and may employ a variety of decision processing. These rotation decision processing are not necessarily the same. This is because principal moments of inertia in three axial directions depend on a mass distribution of the device being protected and are not generally the same, making the characteristics of the acceleration waveforms different among different axial directions. It is therefore preferable to determine the contents of the rotation decision processing 1-3 by performing a simulation of rotary motion based on the mass distribution of the device and taking actual measurements in a test device based on a simulated mass distribution. The principal moment of inertia is a moment of inertia tensor, or a second order tensor, diagonalized. In the following description, the moment of inertia refers to a principal moment of inertia.

FIG. 4 shows an applicable range of the fall decision method. A method that detects a fall when a detected acceleration is below a threshold for all axes is applied where the rotation during a fall of the device is slow. A method of detecting a rotation during a fall based on the rotation decision processing is applied where the rotation during a fall is fast. As to the rotation of an intermediate speed, the decision results of the two methods are weighted appropriately and an overall decision is made.

Figure 5A:
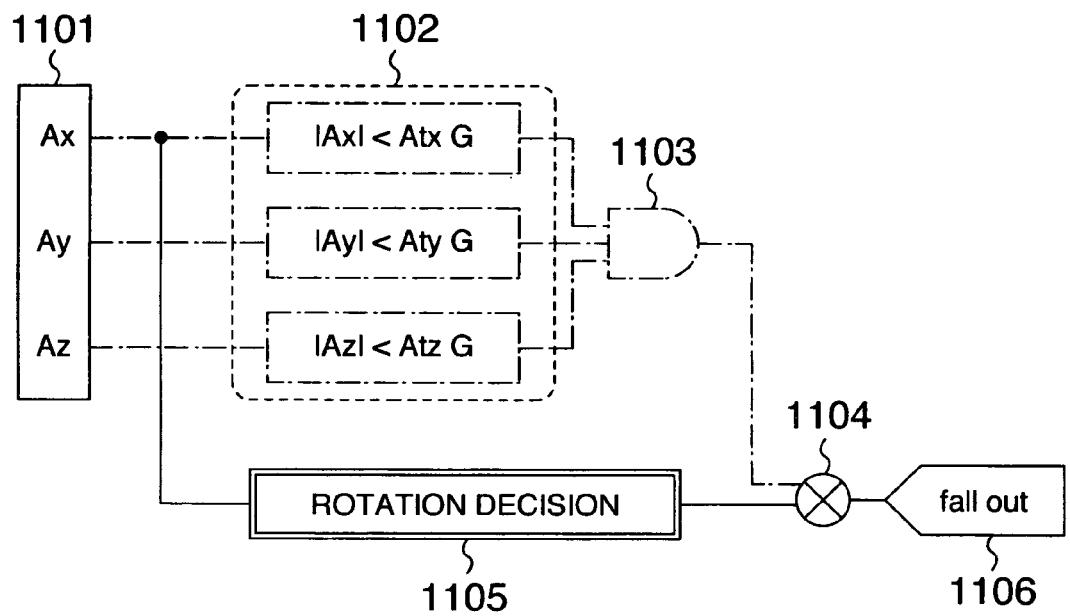
Figure 5B:
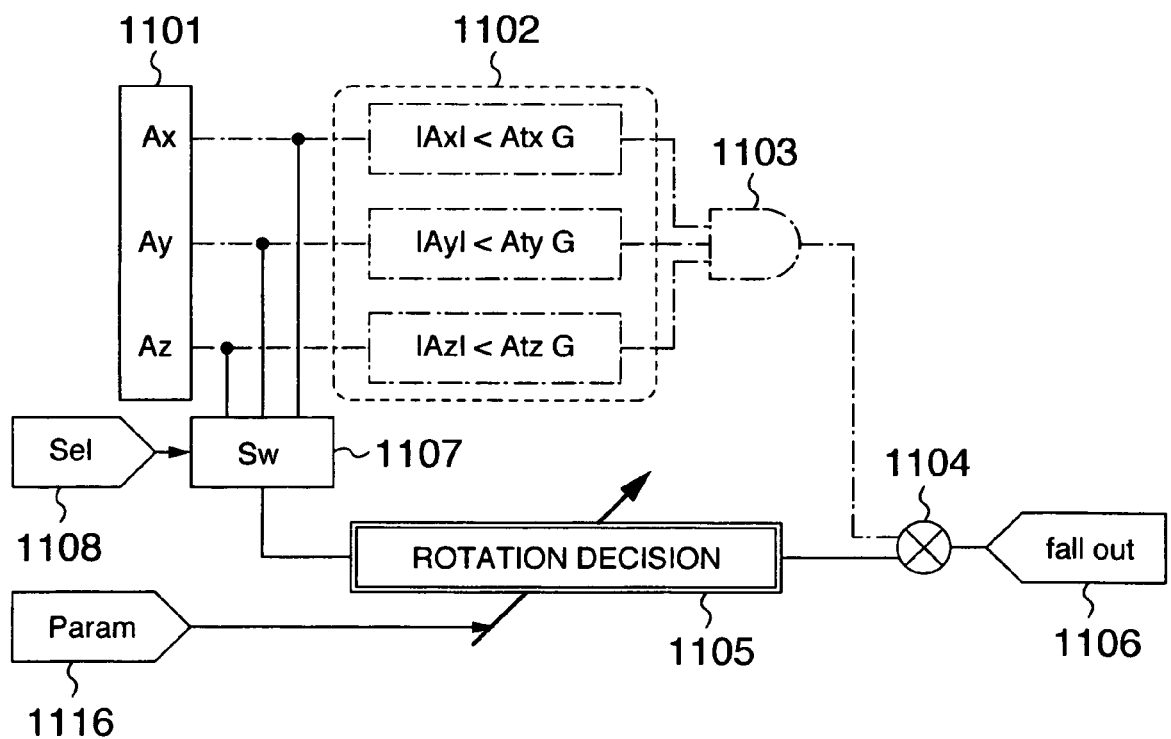

FIG. 5A to 5C are functional block diagrams of another embodiment of a free fall detection device according to this invention. These represent a case where the rotation decision processing is made unsymmetrical among the axes and a case where the processing can be switched among the different axes.

FIG. 5A represents an embodiment in which the rotation decision unit 1105 is provided only for one axis, for example, the x-axis. Normally, when the rotation decision axis is limited to only one, if a stable rotation occurs about that axis, it is difficult to identify the rotation characteristic from acceleration changes. However, the principal moment of inertia is not the same for all axes. Particularly the rotary motion about the axis having a moment of inertia of an intermediate value is known to vary greatly and be unstable. So, choosing for the rotation decision processing the acceleration axis in a direction in which acceleration variations can be detected makes it possible to reduce the number of rotation decision units 1105 to only one. In FIG. 5A, the x-axis is selected as a detection axis. In this case, if we let the principal moments of inertia about x, y and z axis be Ix, Iy and Iz, there is a relation Iy>Ix>Iz or Iz>Ix>Iy. By employing only one rotation decision unit, the circuit scale of the free fall detection device, manufacturing cost, power consumption and the umber of adjustment points can be reduced.

In the example of FIG. 5A, an accelerometer is preferably installed so that the acceleration detection axis used for the rotation decision processing is out of alignment with the principal axis direction. This arrangement increases the variation in rotary motion and thus improves a detection accuracy. Depending on a possible rotation state, the rotation decision unit may be provided to each of two or more acceleration detection axes, but less than the total number of axes.

FIG. 5B shows an example in which the axis used for the rotation decision processing can be made selectable by a switch unit 1107 and a selector unit 1108. This example can alleviate restrictions on the direction in which the free fall detection device including the accelerometer is mounted in the device to be protected. The selection of axis by the switch unit 1107 and the selector unit 1108 is done in the stage of designing the device to be protected. Further, a parameter setting terminal 1116 is provided for changing parameter settings in the rotation decision unit, e.g., fc and threshold in FIG. 2A. In other than this embodiment, the parameter setting terminal may also be provided, though its description is omitted.

FIG. 5C shows an embodiment in which an axis used for the rotation decision processing is switched among the three axes when all the three axes are used for the rotation decision processing. In this embodiment, a matrix switch unit 1109 is used to change the connection between the detection axis x, y, z and the rotation decision unit 1, 2, 3 as desired. This embodiment can alleviate restrictions on the direction in which the free fall detection device including the acceleration sensor is mounted in the device to be protected, with all the three axes covered by the rotation decision processing. The number of axes used in the rotation decision processing does not have to be equal to the number of total acceleration detection axes. Further, the number of rotation decision units each requiring a circuit scale configuration and the number of acceleration detection axes may be set different. For example, only one rotation decision unit 1 may perform a waveform decision that requires a circuit scale configuration and the other rotation decision units 2, 3 may perform simple processing, not requiring a circuit scale configuration. It is also possible to use a relative relation decision unit 1117 and use a relative relation of characteristic quantities of rotary motion, extracted by the rotation decision units for a plurality of axes, to enhance the accuracy of the rotation decision. Examples of relative relation decision criteria include whether or not a relative value of center frequency of acceleration waveform obtained for each axis falls within a predetermined ratio, or whether a maximum amplitude of a time-area acceleration waveform is within a predetermined range for all axes during the period of fall. The relative relation decision unit is not limited to the example of FIG. 5C and may employ other configurations using a plurality of rotation decision units. It is also possible to include the relative relation decision unit 1117 in the rotation decision unit 1105 and connect a plurality of rotation decision units 1105 with one another.

Figure 6A:
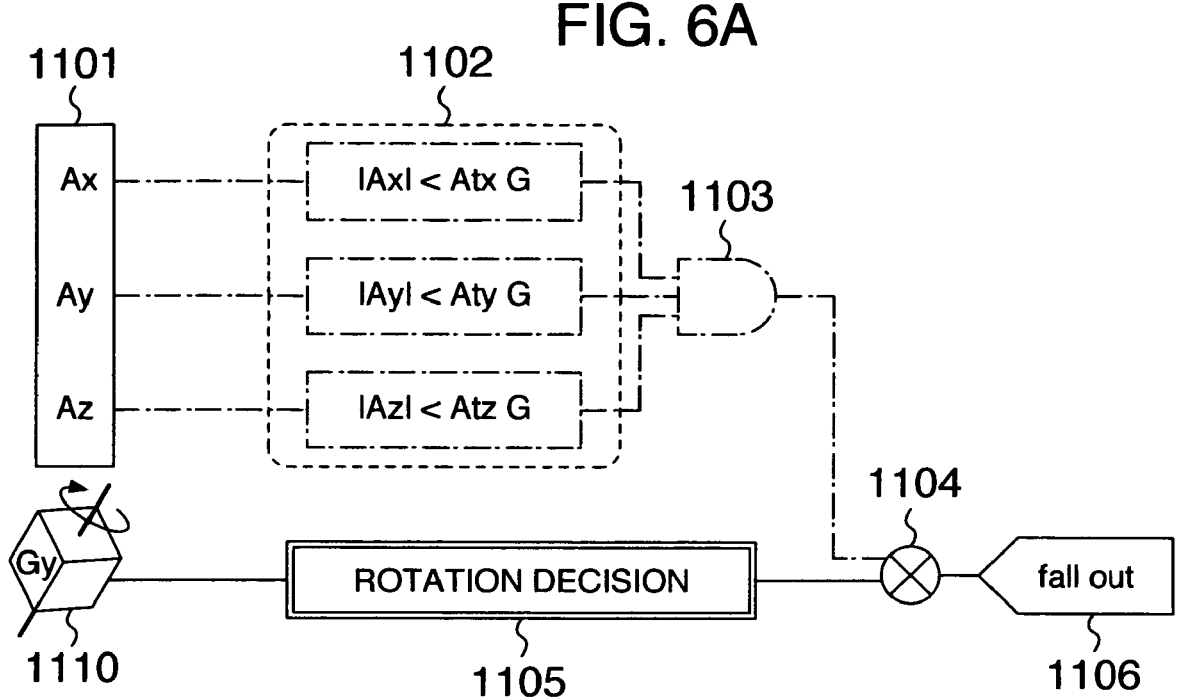
Figure 6B:
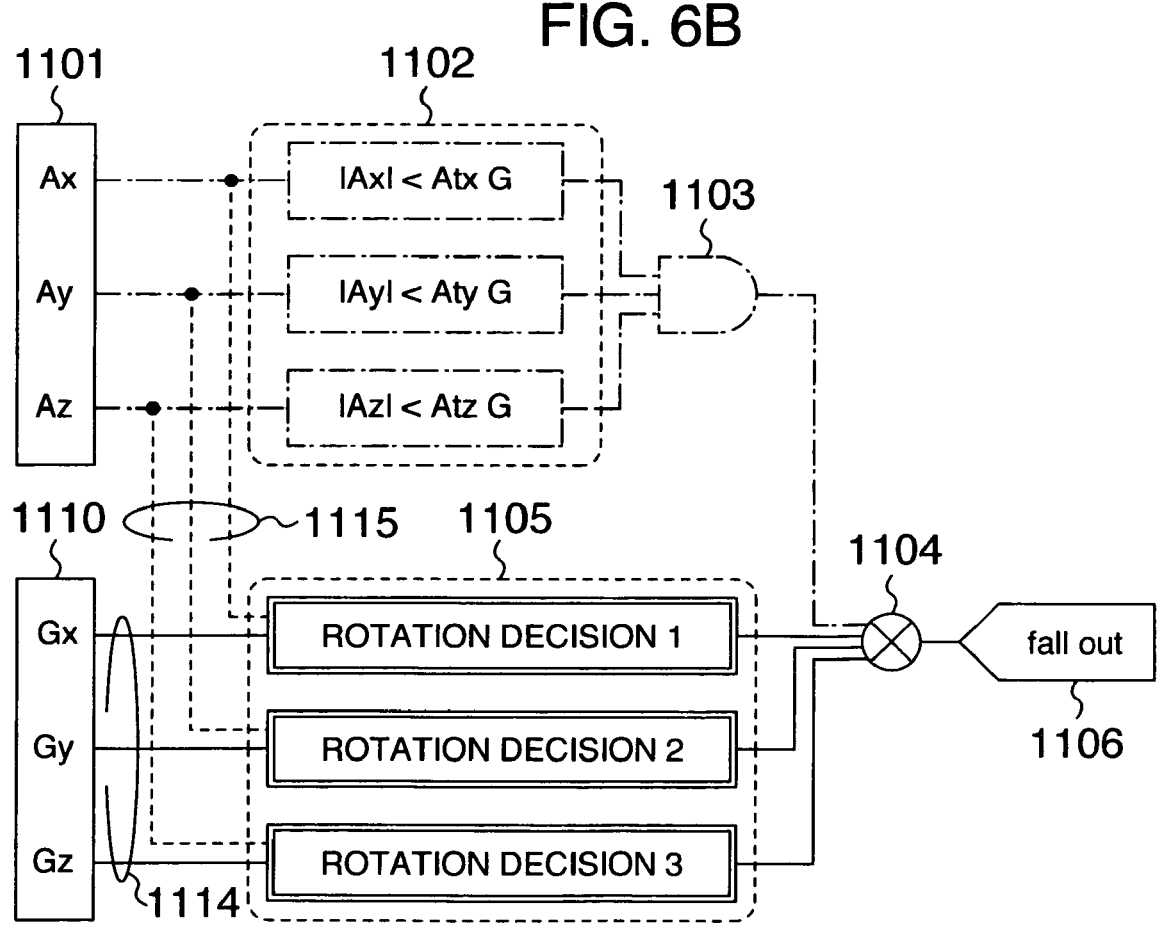

FIG. 6A to 6C show functional block diagrams of a free fall detection device as another embodiment of this invention, which uses a combination of an accelerometer and an angular rate sensor (gyro), an angular velocity detection unit.

FIG. 6A represents an embodiment using a combination of a 3-axis accelerometer 1101 and a 1-axis angular velocity sensor 1110. The rotation decision unit 1105 identifies a fall accompanied by rotation from the characteristic of an angular velocity signal waveform detected by the angular velocity sensor 1110. As in the embodiment of FIG. 3A, it is preferred that an axis having a large rotary motion variation be chosen as a detection axis of the angular velocity sensor 1110. Alternatively, the angular velocity detection axis may be arranged so as to be out of alignment with a stable principal axis direction.

FIG. 6B represents an embodiment using a combination of a 3-axis accelerometer 1101 and a 3-axis angular velocity sensor 1110. In the embodiment of FIG. 6B, the rotation decision unit inputs an acceleration signal output from the accelerometer 1101 through an accelerometer connecting unit 1115 and uses it together with an angular velocity signal output from the angular velocity sensor 1110 to determine a fall accompanied by rotation. Further, an angular velocity sensor connecting unit 1114 may be made disconnectable. When the angular velocity sensor is not connected, only the acceleration signal output from the accelerometer through the accelerometer connecting unit 1115 may be used in the rotation decision processing. The number of axes for the angular velocity sensor is not limited to three axes. Further, the angular velocity sensor may be mounted in the same package or module as the accelerometer or in a separate package or module.

FIG. 6C represents an embodiment with a gravity center acceleration calculation unit 1111 which detects a fall by using an acceleration signal from the accelerometer and an angular velocity signal from the angular velocity sensor to calculate an acceleration at the gravity center of the device being protected. The operation of this embodiment will be explained by referring to FIGS. 7A, 7B.

Figure 7A:
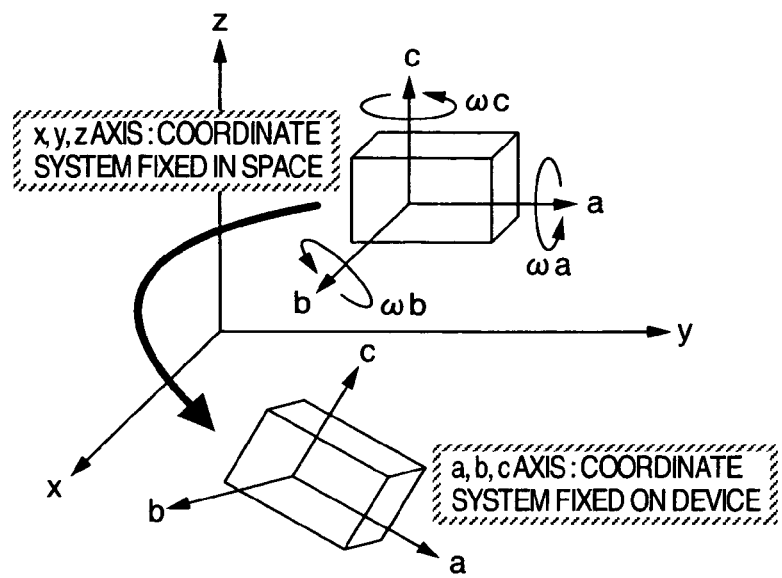
FIGS. 7A, 7B, 7C, 7D, 7E are explanatory diagrams showing an operation of the embodiment of FIG. 6C.
Figure 7B:
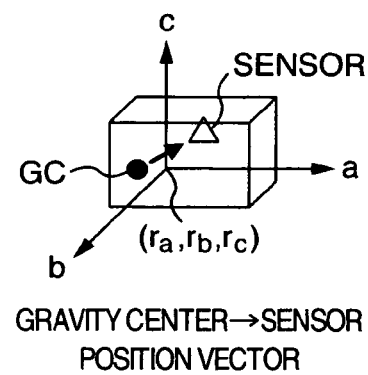

For coordinate systems shown in FIG. 7A and FIG. 7B, angular velocities ($\omega_a$, $\omega_b$, $\omega_c$) and position vectors ($r_a$, $r_b$, $r_c$) directed from a gravity center (GC) toward the accelerometer positions, the following equation (1) holds when the device being protected is falling and no external force is acting on it. A fall can be determined by the equation (1). In the equation, $D_a$, $D_b$ and $D_c$ are acceleration values of the accelerometers in the a-, b- and c-axis directions.

$$\begin{bmatrix} (\omega_b^2 + \omega_c^2) \cdot r_a - (\omega_b \cdot r_b + \omega_c \cdot r_c) \cdot \omega_a - D_a \\ (\omega_c^2 + \omega_a^2) \cdot r_b - (\omega_c \cdot r_c + \omega_a \cdot r_a) \cdot \omega_b - D_b \\ (\omega_a^2 + \omega_b^2) \cdot r_c - (\omega_a \cdot r_a + \omega_b \cdot r_b) \cdot \omega_c - D_c \end{bmatrix} \cong \begin{bmatrix} 0 \\ 0 \\ 0 \end{bmatrix} \quad (1)$$

Figure 7C:
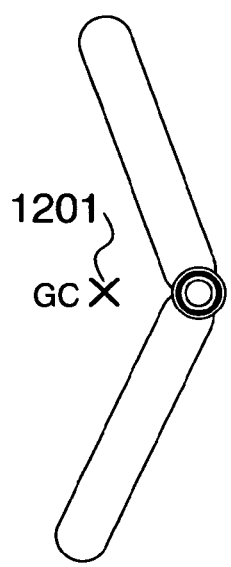
Figure 7D:
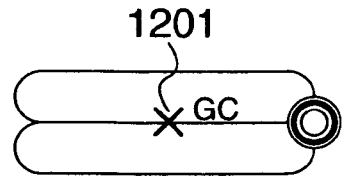
Figure 7E:
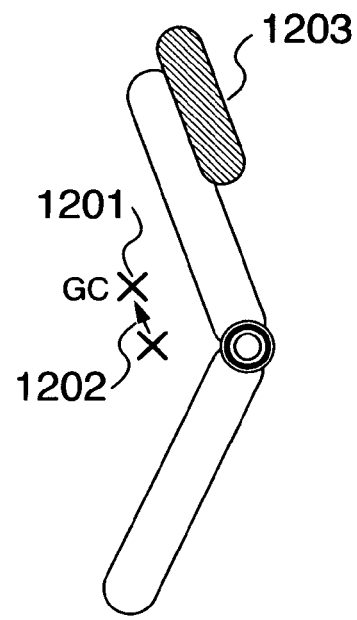

A gravity center position/sensor position/moment of inertia information input unit 1112 shown in FIG. 6C supplies information required by the equation (1). In practice, however, errors caused by air resistance and accuracy of the sensors used should preferably be taken into account. If the shape of the device being protected is not symmetric, an inclination of the principal axis is considered and a coordinate transformation is performed as required. Since, with this embodiment, an acceleration at the gravity center position of the device can be known, the sensors may be located at positions remote from the gravity center. Not only does this arrangement alleviate the restrictions on the sensor mounting position but it can also be applied when the gravity center (GC) is outside the device, as shown in FIG. 7C. Further, by using a geometrical shape deformation information/mounted-dismounted device information input unit 1113 of FIG. 6C, it is possible to obtain information about shape changes that may cause a change in the gravity center position of the device. Thus, the fall decision can be made by considering a change in the gravity center position that would occur when a flip phone is folded closed as shown in FIG. 7D. When the position of the gravity center changes, the position vectors from the gravity center to the sensors in the equation (1) also change. Another example that may bring about a change in the gravity center position is when detachable parts 1203 are mounted as shown in FIG. 7E. In addition to components for functional addition, the detachable parts include a detachable battery pack with a capacity different from the built-in battery. Even when the position of the gravity center changes due to the attached parts as indicated at 1202, the gravity center position is corrected by using information entered from the geometrical shape deformation information/mounted-dismounted device information input unit 1113. The angular velocity used in this embodiment is not limited to the one obtained from the angular velocity sensor but an angular velocity calculated by a plurality of accelerometers arranged in a particular geometrical shape may also be used.

Figure 8A:
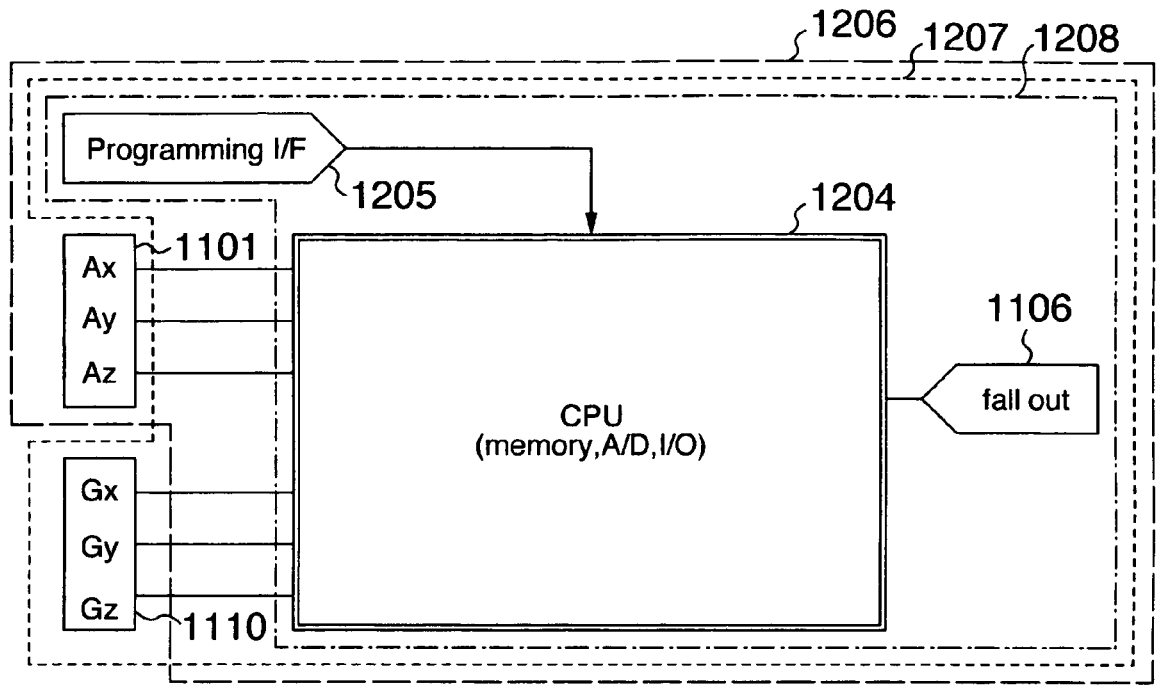
FIGS. 8A, 8B are functional block diagrams of a free fall detection device as yet another embodiment of this invention.
Figure 8B:
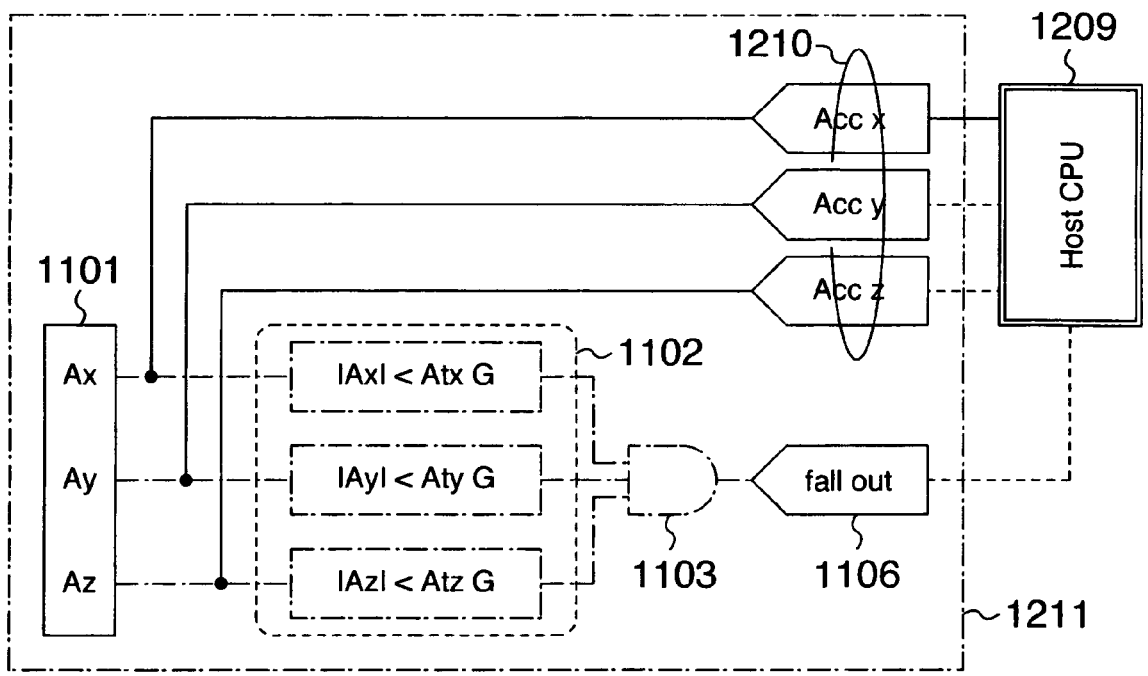

FIGS. 8A and 8B show functional block diagrams of a free fall detection device as a further embodiment of this invention.

FIG. 8A represents an embodiment that uses a microcomputer 1204 for the decision of a fall. A program in the microcomputer 1204 executes fall decision processing similar to that performed in the preceding embodiments which detects a free fall not accompanied by rotation when, for example, accelerations in three axial directions not lying in the same plane become almost zero simultaneously. The program also executes rotation decision processing that detects a rotation during the free fall. The decision on the rotation does not have to use all sensor axes. If the angular velocity sensor 1110 is used in addition to the multiaxial accelerometer 1101, the fall decision may be performed using equation (1) that determines the motion of the gravity center of the device, as in the configuration shown in FIG. 6C. From a programming terminal 1205 at least one of the fall decision program and setting parameters can be entered. This program includes at least a portion that identifies a rotation from the characteristics of acceleration waveform caused by a centrifugal force during the fall and a portion that identifies a fall from equation (1). A portion 1206 enclosed by a dashed line, a portion 1207 enclosed by a dotted line, and a portion 1208 enclosed by a one-dot chain line are built as one module or one chip.

FIG. 8B represents an embodiment that detects a fall by a host CPU 1209 in the device. In the figure, a portion enclosed by a one-dot chain line is formed into one module or one chip as an acceleration sensor module 1211. The fall decision program in the host CPU 1209 performs a fall decision by combining the detection of a fall not accompanied by rotation and the rotation decision processing, as in FIG. 8A, or makes a fall decision using the equation (1) that determines a motion of the gravity center of the device being protected. The data taken into the host CPU may be only the 3-axis acceleration outputs produced at an acceleration output terminal 1210, or a combination of acceleration outputs for two axes or less and a detection output of a fall without rotation that has been subjected to a threshold decision in the sensor module and then output from the fall detection output terminal 1106. When the host CPU takes in 3-axis accelerations and performs a threshold decision to detect a fall not accompanied by rotation, the acceleration sensor module 1211 in FIG. 8B may not include the fall decision unit 1102, the logic. operation unit 1103 and the fall detection output terminal 1106 but comprise the multiaxial accelerometer 1101 and the acceleration output terminal 1210. It is also possible to use the angular velocity sensor as well. Further, the functions of the above host CPU may be served by a house keeping CPU of the device.

FIG. 9 shows an example portable device in which the free fall detection device of this invention is mounted. The portable device 1901 to be protected against fall is a cell phone for example. The portable device 1901 is mounted with a magnetic disk drive 1903. The package or module including an accelerometer body 1905 is placed at a mounting position 1902 in the portable device. In this embodiment, due to limitations on the layout of various parts in the portable device, the mounting position 1902 of the accelerometer is away from a gravity center 1904 of the portable device 1901. The accelerometer body 1905, as indicated in an enlarged view, is a semiconductor sensor manufactured by the MEMS (Micro Electro Mechanical System) process. In the accelerometer body 1905, a weight 1907 is supported by beams 1906. Deformation of the beams 1906 caused by an acceleration is detected by piezoelectric elements 1908 formed on the accelerometer body to detect 3-axis accelerations. When a fall is detected by the accelerometer, a magnetic disk head parting command signal 1909 is issued from the sensor module or sensor package or their peripheral circuits to a magnetic disk drive 1903. As a result, the head can be parked before the portable device 1901 hits the ground, improving an impact resistance of the device. Although this embodiment uses a semiconductor accelerometer formed by microfabricating a semiconductor substrate with the MEMS process, various other accelerometers can be applied.

Figure 10A:
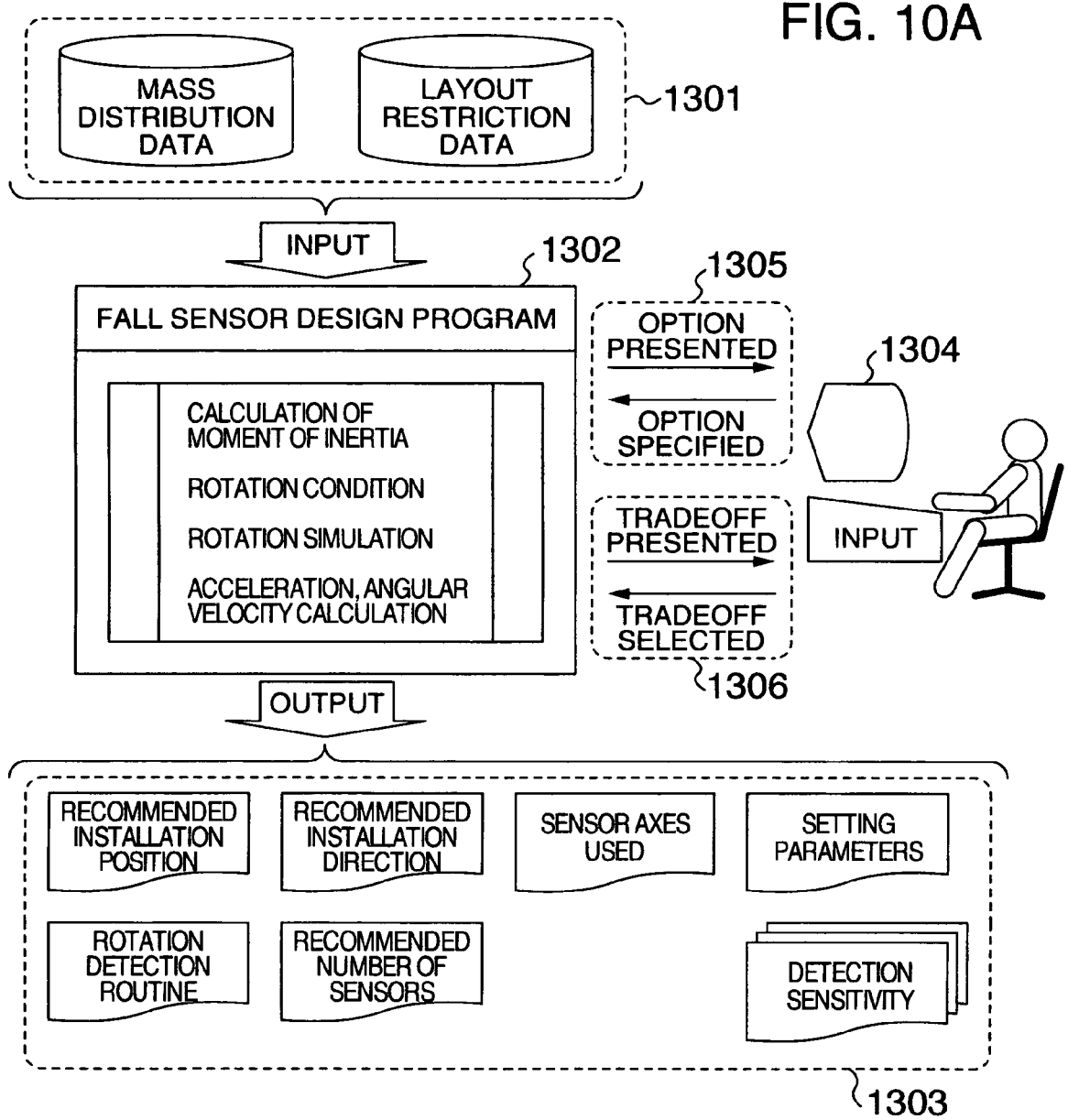
FIGS. 10A, 10B illustrate design support systems for the free fall detection device.
Figure 10B:
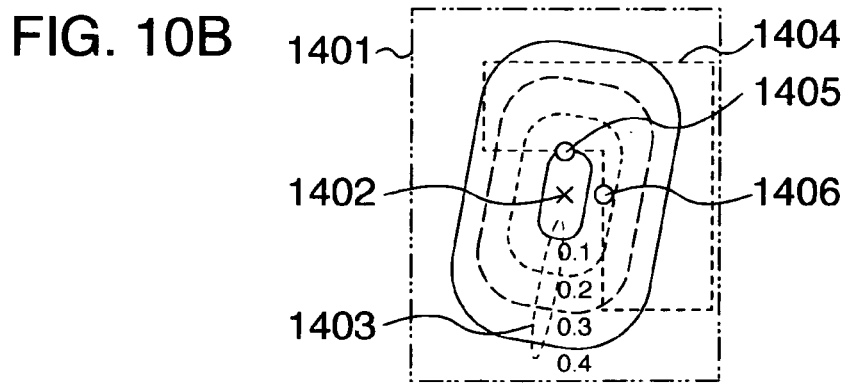

FIGS. 10A and 10B show design support systems for the free fall detection device. The design of the free fall detection device needs to consider many factors, such as sensor kind, installation direction and the number of axes used as well as sensor mounting positions in the device. Thus, the program for supporting a design of the free fall detection device can be provided in the form of software attached to the sensor, independent package software or freeware, allowing a free fall detection device with high detection accuracy and reliability to be designed.

FIG. 10A shows one example of a free fall detection device design support system using a dedicated program. As input data 1301, a mass distribution of the device to be protected and layout restriction data are used. The mass distribution may be generated internally by directly reading CAD data on material and shape and considering specific gravity data for each material. The layout restriction data includes sensor installable locations, installable areas on the substrate and installable directions. Based on these data about the device to be protected and design options 1305 and tradeoff information 1306 specified by the user, a fall sensor design program 1302 supports the design of the free fall detection device. The user may be required to perform a simple work, such as answering questions through a user console 1304. Specifying the options and tradeoffs may be done by specifying a file rather than using the console. The output data 1303 includes at least one of recommended installation position of the sensor, recommended installation direction, sensor axes used, setting parameters, rotation detection routines, recommended number of sensors and detection performance.

FIG. 10B shows an example use of the layout restriction data 1301. Denoted 1401 is the device to be protected, 1402 a gravity center position projected onto the sensor installation plane, and 1403 a design value contour. The design value contour 1403 is a distribution of maximum acceleration produced when the device is allowed to fall by giving initial conditions that cause it to rotate in various directions at a particular initial rotation speed. At this time, ideally the sensor is supposed to be installed at the gravity center projected position 1402. However, the layout restriction 1404 makes such positioning difficult. Thus, only in terms of the shortest distance from the gravity center, a installation point 1405 and 1406 may be picked up as possible candidates for installation position. A check with the design contour 1403 decides that an appropriate installation point is the point 1405. A second candidate may be picked up as follows. From the design value contour 1403, an appropriate position is somewhere near the installation point 1405 rather than the installation point 1406. The design support for free fall detection performs these operations by accepting specifications from the user, as required.

FIGS. 11A and 11B show one example of an interface of the free fall detection device design support system.

FIG. 11A shows displayed contents on the console (FIG. 10A, 1304) that functions as an interface for setting design options (FIG. 10A, 1305). On the display a kind of the sensor used is specified at a field 1501. For example, it is specified whether only accelerometer is used or other sensors such as angular velocity sensor are used in combination. At a field 1502 a type number of the sensor is entered. As for these information, candidates may be automatically narrowed down as the design proceeds. The number of sensor axes used that is specified at a field 1503 can automatically be narrowed down. In the field 1504 where a desired detection sensitivity is specified, a decision rate or a distance of fall that can be detected may be entered, rather than specifying a high or low sensitivity. A field 1505 represents an order of performance priority which specifies which performance value is given a priority in the design. Specified in a field 1506 of HDD parking time is a time it takes for the magnetic disk in operation to get actually parked after receiving a parking signal. These may be specified by the type number of the magnetic disk. A field 1507 represents a distance that the device falls. Generally, the greater the distance fallen, the longer the time available to detect the fall becomes and thus the higher the fall detection accuracy will be. A field 1508 of HDD access duty specifies a frequency of use of the magnetic disk. For example, if a data rate required by the application used in the device to be protected is low, the rate of magnetic disk operation time occupying the operation time of the device is low. Therefore, a problem is small if a rate of erroneous fall decision (a decision that wrongly decides that a fall has occurred when there is no fall) should be increased. Generally, when the erroneous decision rate is high, a true fall detection rate is also high. So, by increasing the erroneous decision rate within an allowable range, the fall detection sensitivity can be enhanced to improve the magnetic disk protection performance.

FIG. 11B shows an example of tradeoff information (FIG. 10A, 1306). The fall sensor design program performs mainly a notification 1601, inquiry 1602, tradeoff specification 1603 and displaying of simulation results 1604, to provide an interface between the user and the sensor as it proceeds the design process.

Embodiments of this invention have been described, and various modifications may be made within a technical spirit of this invention.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A free fall detection device comprising:
   an acceleration detection unit installed in the device to detect an acceleration of the device in each of three axial directions; and
   a rotation decision unit to detect a fall, accompanied by a rotation of the device, from a waveform of the acceleration detected by the acceleration detection unit that has a substantially sinusoidal shape along one of the three axial directions, with a principal moment value of inertia that is an intermediate value among values corresponding to each of the three axial directions.

2. A free fall detection device according to claim 1, wherein the waveform is a smooth, self-repeating waveform.

3. A free fall detection device according to claim 1, further including a fall decision unit that detects a fall of the device when all of the accelerations in the three axial directions are almost zero.

4. A free fall detection device according to claim 3, wherein the fall decision unit detects a fall of the device when all of the accelerations in the axial directions are smaller than a predetermined threshold.

* * * * *